United States Patent
Wu et al.

(10) Patent No.: US 7,769,926 B2
(45) Date of Patent: Aug. 3, 2010

(54) METHOD FOR PROVIDING A BUFFER STATUS REPORT USING USER EQUIPMENT TO CALCULATE AVAILABLE SPACE OF A PROTOCOL DATA UNIT IN A MOBILE COMMUNICATION NETWORK

(75) Inventors: Chunli Wu, Beijing (CN); Tsung-Liang Lu, Dali (TW); Chung-Shan Wang, Sinfong Township, Hsinchu County (TW); Yen-Chen Chen, Jhongli (TW); Li-Cheng Lin, Yilan (TW)

(73) Assignee: Sunplus mMobile Inc., Hsinchu (TW)

( * ) Notice: Subject to any disclaimer, the term of this patent is extended or adjusted under 35 U.S.C. 154(b) by 14 days.

(21) Appl. No.: 12/289,418

(22) Filed: Oct. 28, 2008

(65) Prior Publication Data

US 2009/0113086 A1   Apr. 30, 2009

Related U.S. Application Data

(60) Provisional application No. 61/000,729, filed on Oct. 29, 2007, provisional application No. 61/006,248, filed on Jan. 3, 2008, provisional application No. 61/006,930, filed on Feb. 7, 2008.

(51) Int. Cl.
*G06F 13/00* (2006.01)
*H04B 7/216* (2006.01)
*H04J 3/12* (2006.01)

(52) U.S. Cl. .............. 710/56; 710/53; 710/54; 710/55; 710/52; 370/330; 370/331; 370/332; 370/333; 370/334; 370/335; 370/336; 370/337; 370/338; 370/339; 370/340; 370/341

(58) Field of Classification Search ............. 710/52–56; 370/330–341
See application file for complete search history.

(56) References Cited

U.S. PATENT DOCUMENTS 7,092,373 B2 *   8/2006   Parantainen et al. ........ 370/337
(Continued)

FOREIGN PATENT DOCUMENTS

EP    1 599 063 A1 *   11/2005

OTHER PUBLICATIONS

Samsung, Buffer Status Reporting, XP-002522065, Tdoc R2-074265, Shanghai, China Oct. 8-12, 2007.*

(Continued)

*Primary Examiner*—Tammara Peyton
(74) *Attorney, Agent, or Firm*—Bacon & Thomas, PLLC

(57) ABSTRACT

A method for providing a buffer status report in a mobile communication network is implemented between a base station and a user equipment. When data arrives to buffers of the user equipment and the priority of a logical channel for the data is higher than those of other logical channels for existing data in the buffers, a short buffer status report associated with the buffer of a logical channel group corresponding to the arrival data is triggered. The user equipment is based on obtained resources allocated by the base station to fill all data of the buffer of the logical channel group in a Protocol Data Unit. If all data of the buffer of the logical channel group corresponding to the arrival data can be completely filled in the Protocol Data Unit, the short buffer status report is canceled. Otherwise, the user equipment transmits the short buffer status report.

18 Claims, 7 Drawing Sheets

U.S. PATENT DOCUMENTS

| | | | |
|---|---|---|---|
| 7,164,654 B2* | 1/2007 | Hunzinger et al. | 370/230 |
| 7,525,925 B2* | 4/2009 | Muthiah | 370/252 |
| 7,539,165 B2* | 5/2009 | Toskala et al. | 370/335 |
| 7,594,010 B2* | 9/2009 | Dohler et al. | 709/224 |
| 2003/0064681 A1* | 4/2003 | Uedo | 455/3.06 |
| 2004/0228313 A1* | 11/2004 | Cheng et al. | 370/342 |
| 2005/0041694 A1* | 2/2005 | Liu | 370/524 |
| 2005/0105553 A1* | 5/2005 | Zhang et al. | 370/468 |
| 2005/0220040 A1* | 10/2005 | Petrovic et al. | 370/278 |
| 2007/0097937 A1* | 5/2007 | Kubota et al. | 370/338 |

OTHER PUBLICATIONS

Nokia, Buffer Reporting for E-UTRAN, XP003013941, R2-060829, Athens, Greece 27-3 Mar. 1, 2006.*

* cited by examiner

METHOD FOR PROVIDING A BUFFER STATUS REPORT USING USER EQUIPMENT TO CALCULATE AVAILABLE SPACE OF A PROTOCOL DATA UNIT IN A MOBILE COMMUNICATION NETWORK

CROSS-REFERENCE TO RELATED APPLICATION

This application claims the benefit of the filing dates of U.S. Provisional Application Ser. No. 61/000,729, entitled "A METHOD FOR UL SCHEDULING INFORMATION" filed Oct. 29, 2007, U.S. Provisional Application Ser. No. 61/006,248, entitled "BUFFER STATUS REPORT TRIGGERS IN E-UTRA" filed Jan. 3, 2008, and U.S. Provisional Application Ser. No. 61/006,930, entitled "AN ENHANCED BUFFER STATUS REPORTING MECHANISM" filed Feb. 7, 2008 under 35 USC & 119(e)(1).

BACKGROUND OF THE INVENTION

1. Field of the Invention

The present invention relates to the technical field of mobile communications and, more particularly, to a method for providing a buffer status report in a mobile communication network.

2. Description of Related Art

In a 3G mobile communication network, a base station of the network side is provided for servicing the user equipments (UEs) in a cell controlled by the base station. Accordingly, the base station needs to understand the working status of the UEs in order to appropriately allocate the resources for a communication without a waste. Uplink traffics existing in a Universal Mobile Telecommunication System High-Speed Uplink Packet Access (UMTS HSUPA) and an Evolved UMTS Terrestrial Radio Access (E-UTRA) applies a network-controlled scheduler mechanism controlled by the network side to complete the requirement cited above. FIG. 1 is a schematic diagram of a base station 12 at the mobile communication network side and a plurality of user equipments 11. For an appropriate resource allocation between the UEs 11, the UE 11 need to provide all uplink scheduling information to the scheduler of the base station 12 of the network side. In a UMTS HSUPA system, such uplink scheduling information contains 18-bit scheduling information (SI) and one happy bit. The SI can provide the amount of system resources needed by the UE 11 and the amount of resources it can actually make use of to the network side, and the happy bit indicates whether the UE 11 can use more resources. As compared to the UMTS systems, an E-UTRA system uses multiple access schemes and system requirements different from the UMTS systems, and thus providing the uplink scheduling information in more detail is required. For example, for a desired agreement between different UEs or different logical channels of a UE, the E-URTA system reports the buffer status of different logical channel groups (LCGs) to the network side, but the UMTS system only reports the buffer status of the highest-priority logical channel and the status occupied by all buffers to the network side.

FIG. 2 is a schematic diagram of a user equipment 11 used to describe a buffer status report (BSR) mechanism, in which the UE 11 has multiple logical channels (LCs) divided into a plurality of logical channel groups (LCGs) 201-204, each LCG 201-204 having no LC or one or more LCs, each LC having a priority. In addition, each LCG 201-204 has a respective buffer 211-214 and buffer status (BS) 221-224, and the buffers 211-214 are independent buffer memory or provided with a single buffer memory. The buffer statuses 221-224 corresponding to the LCGs 201-204 indicate the occupancy of the buffers 211-214 respectively, and the UE 11 accordingly provides a BSR to the base station 12 of the network side. The content of the BSR of the LCGs 201-204 is shown in FIG. 3 in which the BSR contains same length (five bits) and granularity for the BSs 221-224 corresponding to the buffers 211-214. For example, '00000' in the BSR indicates an empty buffer, '11111' indicates a full buffer, and '10000' indicates a half-full buffer.

The BSR mechanism in existing E-UTRA systems uses a process of per LCG reporting in which the essential agreements are shown as follows:

Agreement 1:

A BSR shall be triggered if any of the following events occur:

(1) Uplink data arrives in the buffers of the UE and the data belongs to a logical channel group with higher priority than those for which data already existed in the buffers of the UE;

(2) In the uplink resources allocated to the UE by the base station, the number of padding bits is larger than the size of the [Short/Long] BSR if pending data is filled into a Protocol Data Unit (PDU) to be transmitted;

(3) A serving cell change occurs.

Agreement 2:

In the uplink resources allocated to the UE by the base station, a pending BSR is cancelled in case a PDU to be transmitted can accommodate all pending data but is not sufficient to accommodate the triggered [Short/Long] BSR in addition.

The short BSR provides the buffer status corresponding to a single LCG, with a format shown in FIG. 4 in which a 2-bit LCG identification (ID) field and a 6-bit buffer size field are included. The LCG ID field indicates the corresponding LCG to the reported buffer status, and the buffer size field indicates all pending data amount of all LCs of the corresponding LCG. The long BSR provides the buffer status of all LCGs, with a format shown in FIG. 5 in which there are three bytes having four 6-bit buffer size fields to indicate LCG ID Number 1-4 respectively.

As cited, the UE sends a short BSR with one byte for providing a buffer status report of one LCG or a long BSR with three bytes for providing a buffer status report of four LCGs.

The first agreement defines that an arrival data with higher priority is allowed to trigger a BSR and a scheduling request is triggered to request an available resource allocation when no uplink resource is allocated to send the triggered BSR. However, for the LC with higher priority due to the arrival data, whether the short BSR of the only LCG corresponding to the LC with higher priority is triggered or the long BSR of the LCGs is triggered is not defined.

Supposed that the short BSR of the only LCG corresponding to the LC with higher priority is triggered, it may happen that an empty BSR is triggered. This is because the BSR reports the remaining data amount in the buffer after the pending data in the buffer is filled in the PDU to be transmitted and all data of LCs with higher priority can be completely transmitted upon the current uplink resource allocation in the UE. In this case, triggering the empty BSR causes a resource waste.

In addition, even the BSR of multiple LCGs is triggered due to the data of LCs with high priority, transmitting the empty BSR of an LCG having no remaining data is not required.

Accordingly, the content of uplink scheduling information provided by the UE requires a further optimization for meeting the real requirements and also minimizing the resource waste.

Therefore, it is desirable to provide an improved method to mitigate and/or obviate the aforementioned problems.

SUMMARY OF THE INVENTION

The object of the present invention is to provide a method for providing a buffer status report in a mobile communication network, which can reduce the use of network resources and prevent the resource waste and the network resources occupied by the undesired BSRs.

According to a feature of the invention, a method for providing a buffer status report in a mobile communication network is provided, which is implemented between a base station and one or more user equipments for providing the user equipments to report buffer status of the user equipments to the base station. Each user equipment has multiple logical channels divided into a plurality of logical channel groups, each logical channel group corresponds to a buffer and a buffer status of the buffer, and each logical channel has a priority. The method includes the steps: (A) having an arrival data to a buffer of the user equipment and the priority of a logical channel for the arrival data higher than those of other logical channels for existing data in the buffers; (B) triggering a short buffer status report associated with the buffer of a logical channel group corresponding to the arrival data; (C) using the user equipment to calculate available space of a transmitting Protocol Data Unit (PDU) based on resources allocated by the base station to thereby determine whether the available space of the PDU to be transmitted is enough for filling all data of the buffer of the logical channel group corresponding to the arrival data; (D) canceling the short buffer status report when all data of the buffer of the logical channel group corresponding to the arrival data can be completely filled in the PDU to be transmitted; and (E) using the user equipment to transmit the short buffer status report when all data of the buffer of the logical channel group corresponding to the arrival data can not be completely filled in the PDU to be transmitted.

According to another feature of the invention, a method for providing a buffer status report in a mobile communication network is provided, which is implemented between a base station and one or more user equipments for providing the user equipments to report buffer status of the user equipments to the base station. Each user equipment has multiple logical channels divided into a plurality of logical channel groups (LCGs), each logical channel group (LCG) corresponds to a buffer and a buffer status of the buffer, and each logical channel has a priority. The method includes the steps: (A) having an arrival data to a buffer of the user equipment and the priority of a logical channel for the arrival data higher than those of other logical channels for existing data in the buffers; (B) triggering a buffer status report (BSR) associated with the buffers of the LCGs that contain data in the buffers; (C) using the user equipment to calculate available space of a transmitting Protocol Data Unit (PDU) based on resources allocated by the base station to thereby determine whether the available space of the PDU to be transmitted is enough for filling all data of the buffers of the LCGs and a short BSR; (D) using the user equipment to transmit the short BSR corresponding to the buffer of an LCG when only the buffer of the LCG has remaining data; and (E) using the user equipment to transmit a long BSR when the buffers of multiple LCGs have remaining data.

According to a further feature of the invention, a method for providing a buffer status report in a mobile communication network is provided, which is implemented between a base station and one or more user equipments for providing the user equipments to report buffer status of the user equipments to the base station. Each user equipment has multiple logical channels divided into a plurality of logical channel groups (LCGs), each logical channel group (LCG) corresponds to a buffer and a buffer status of the buffer, and each logical channel has a priority. The method includes the steps: (A) having an arrival data to buffers of the user equipment and the priority of a logical channel for the arrival data higher than those of other logical channels for existing data in the buffers; (B) comparing the buffer status of other logical channel groups without containing the arrival data and a previous buffer status report (BSR) to thereby produce a comparison difference; and (C) triggering a short BSR associated with the buffer of an LCG corresponding to the arrival data when the comparison difference is smaller than a threshold, and otherwise triggering a BSR associated with the buffers of multiple LCGs that contain data in the buffers.

According to still a further feature of the invention, a method for providing a buffer status report in a mobile communication network is provided, which is implemented between a base station and one or more user equipments for providing the user equipments to report buffer status of the user equipments to the base station. Each user equipment has multiple logical channels divided into a plurality of logical channel groups (LCGs), each logical channel group (LCG) corresponds to a buffer and a buffer status of the buffer, and each logical channel has a priority. The method includes the steps: (A) having an arrival data to buffers of the user equipment and the priority of a logical channel for the arrival data higher than those of other logical channels for existing data in the buffers; (B) comparing the buffer status of other logical channel groups without containing the arrival data and a predetermined value to thereby produce a comparison difference; and (C) triggering a short BSR associated with the buffer of an LCG corresponding to the arrival data when the comparison difference is smaller than a threshold, and otherwise triggering a BSR associated with the buffers of multiple LCGs that contain data in the buffers.

Other objects, advantages, and novel features of the invention will become more apparent from the following detailed description when taken in conjunction with the accompanying drawings.

DETAILED DESCRIPTION OF THE PREFERRED EMBODIMENT

Figure 6:
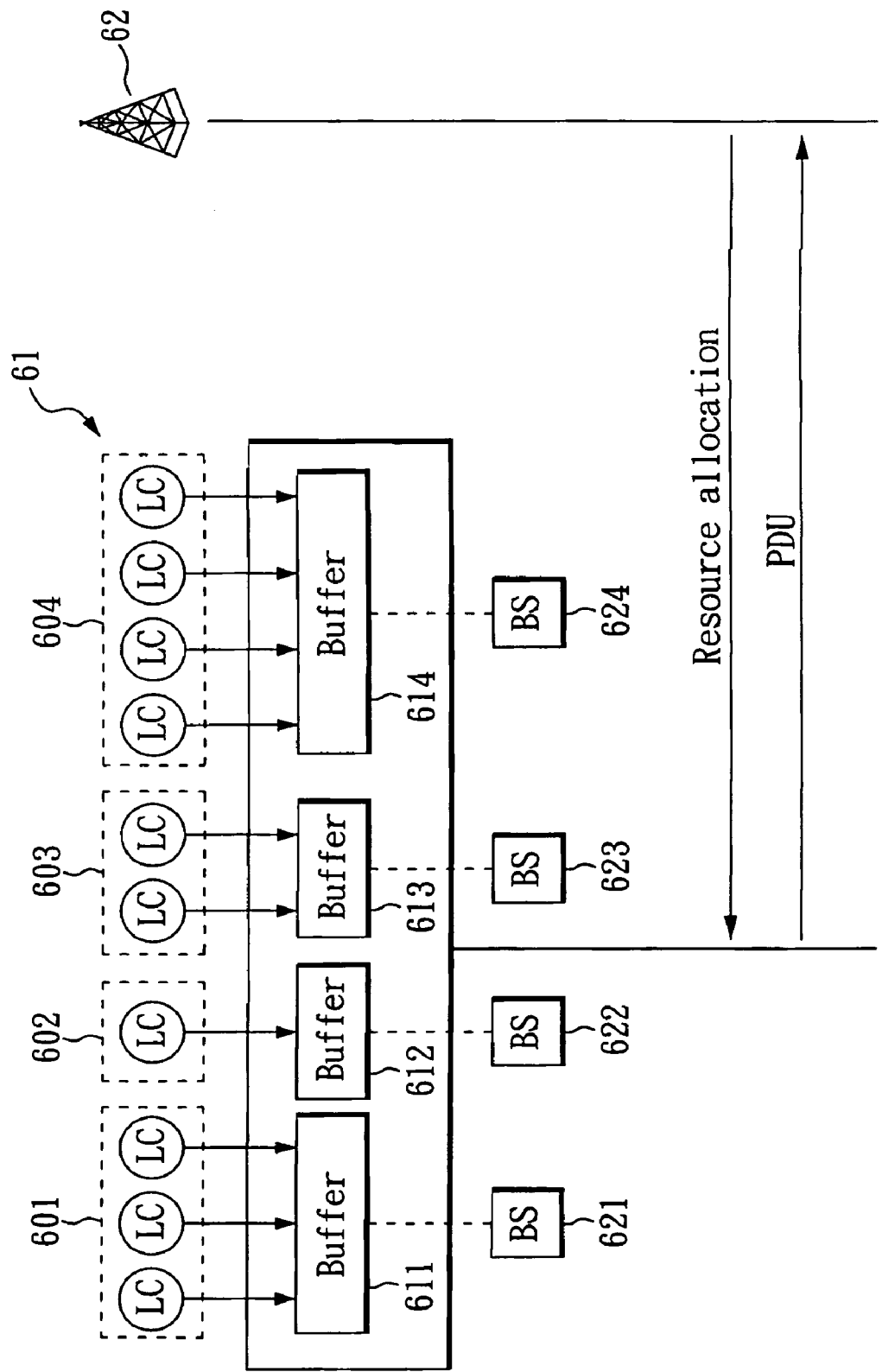
FIG. 6 is a schematic diagram of providing a buffer status report in a mobile communication network according to an embodiment of the invention.

FIG. 6 is a schematic diagram of providing a buffer status report (BSR) in a mobile communication network according to an embodiment of the invention. As shown in FIG. 6, the mobile communication network has one or more user equipments (UEs) 61 and a base station 62. Each UE 61 has multiple logical channels (LCs) divided into a plurality of logical channel groups (LCGs) 601-604. Each LCG 601-604 has one or more LCs, or no LC, and corresponds to a buffer 611-614 and a buffer status 621-624 of the buffer 611-614. Each LC has a priority. The base station 62 performs a resource allocation on the UE 61. Accordingly, the UE 61 can send a Protocol Data Unit (PDU) to the base station 62 for a communication.

Figure 7A:
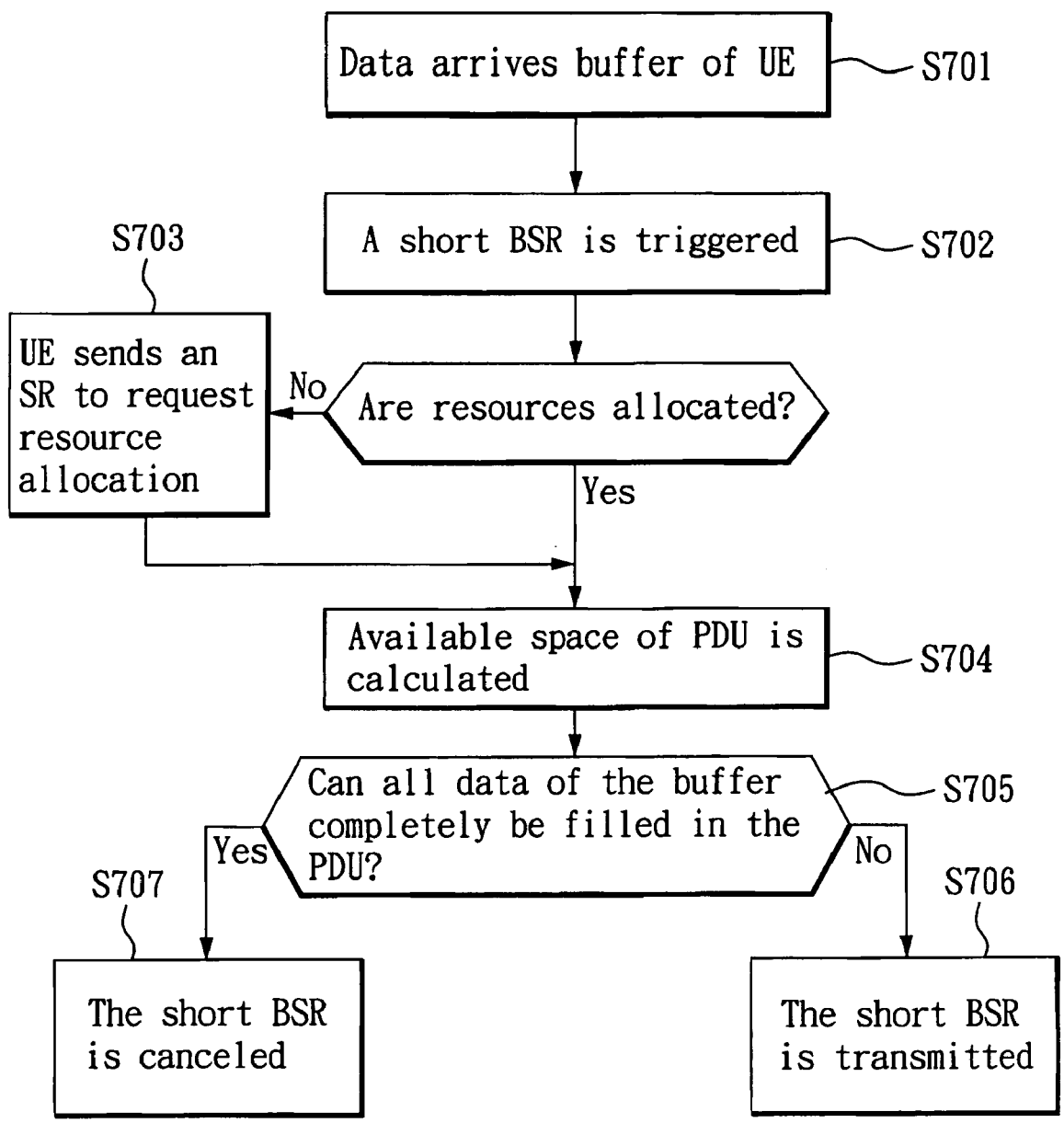
FIG. 7(A) is a flowchart of a method for providing a buffer status report in a mobile communication network according to an embodiment of the invention.

FIG. 7(A) is a flowchart of a method for providing a buffer status report (BSR) in a mobile communication network according to an embodiment of the invention. First, data arrives to the buffer 611 of the user equipment 61 and the priority of a logical channel for the arrival data is higher than those of other logical channels for existing data in the buffers 611-614 (step S701). Accordingly, a short buffer status report (BSR) associated with the buffer 611 of the logical channel group 601 corresponding to the arrival data is triggered (step S702).

After the short BSR is triggered, if the user equipment 61 does not have the resource allocation for the BSR transmission, it sends a scheduling request (SR) to the base station 62 to request a resource allocation (step S703).

The user equipment 61 calculates available space of a transmitting Protocol Data Unit (PDU) based on the resources allocated by the base station 62 (step S704) to thereby determine whether the available space of the PDU to be transmitted is enough for filling all data of the buffer 611 of the logical channel group 601 corresponding to the arrival data (step S705) and further determine the remaining space after the data is filled up. When the available space of the PDU to be transmitted is not enough for filling all data of the buffer 611, the user equipment uses the PDU to transmit the short buffer status report (step S706), and conversely it cancels the short buffer status report (step S707) since all data of the buffer 611 of the logical channel group 601 corresponding to the arrival data can be transmitted completely by the PDU to be transmitted and the short BSR is empty. Thus, when only the buffer 611 of the LCG 601 has the arrival data with higher priority, only the short BSR associated with the buffer 611 of the LCG 601 corresponding to the arrival data is triggered, which can reduce the use of network resources, prevent the UE 61 from transmitting the undesired empty BSR, and further avoid a waste of the network resources.

Figure 1:
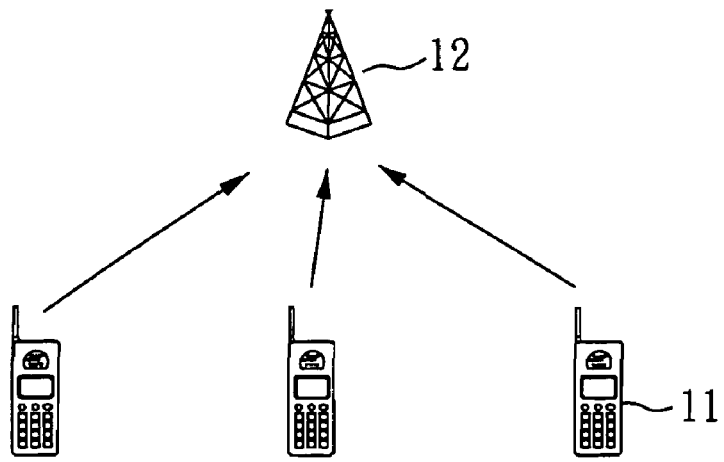
FIG. 1 is a schematic diagram of a base station and user equipments at a mobile communication network side.
Figure 2:
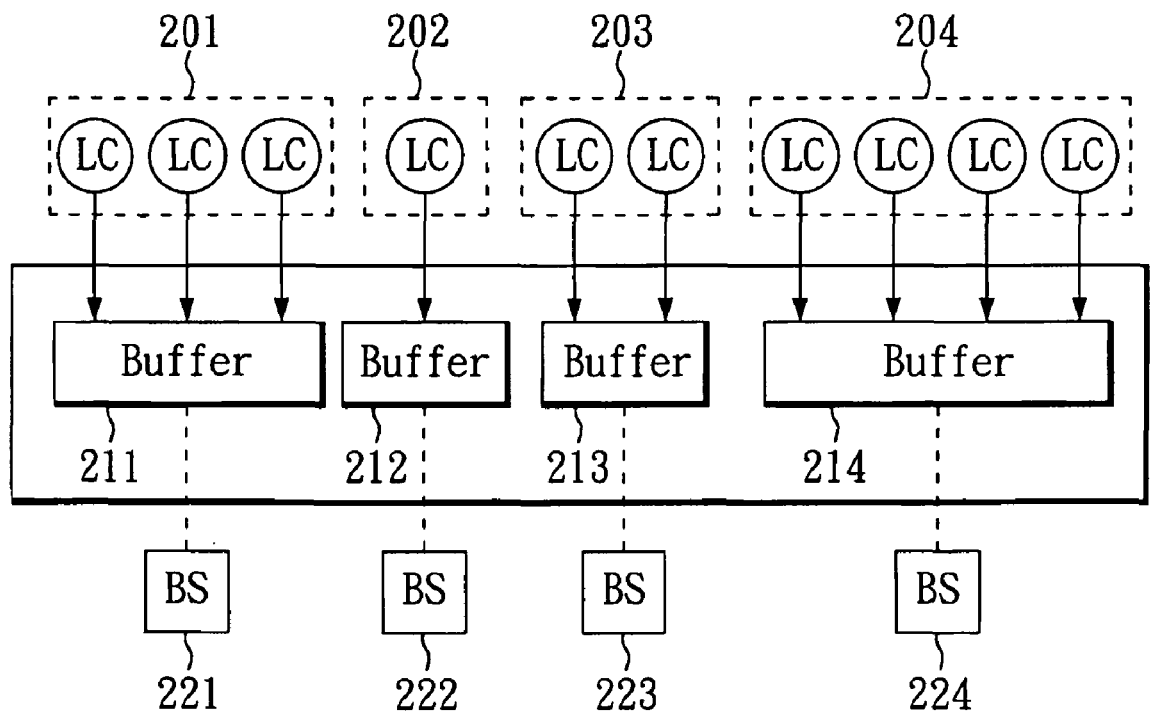
FIG. 2 is a schematic diagram of a user equipment used to describe a typical buffer status report (BSR) mechanism.
Figure 3:
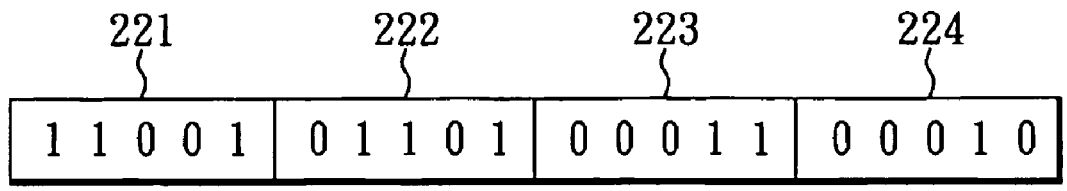
FIG. 3 is a typical BSR content of logical channel groups (LCGs) in the prior art.
Figure 4:
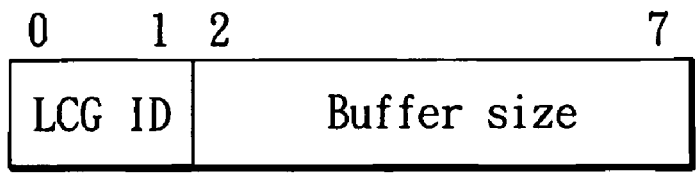
FIG. 4 is a typical format of a short BSR.
Figure 7B:
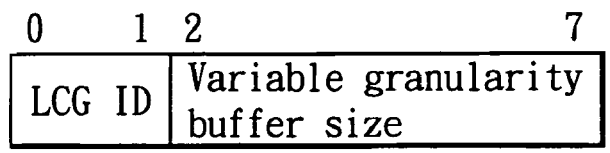
FIG. 7(B) is a format of a short buffer status report (BSR) according to an embodiment of the invention.

In this embodiment, the short BSR can have a format of FIG. 4 or FIG. 7(B) in which the short BSR contains a 2-bit logical channel group identification (LCG ID) field and a 6-bit variable granularity buffer size field. The LCG ID field indicates the corresponding LCG to the reported buffer status, and the variable granularity buffer size field indicates all available data amount of all LCs of the corresponding LCG by means of different granularities. For example, a high granularity can be applied to identify all available data amount of all LCs of an LCG that requires the fine data occupancy, and a low granularity can be applied to identify all available data amount of all LCs of an LCG that does not require the fine data occupancy. In addition, the short BSRs transmitted by different UEs can have different granularities.

Figure 8A:
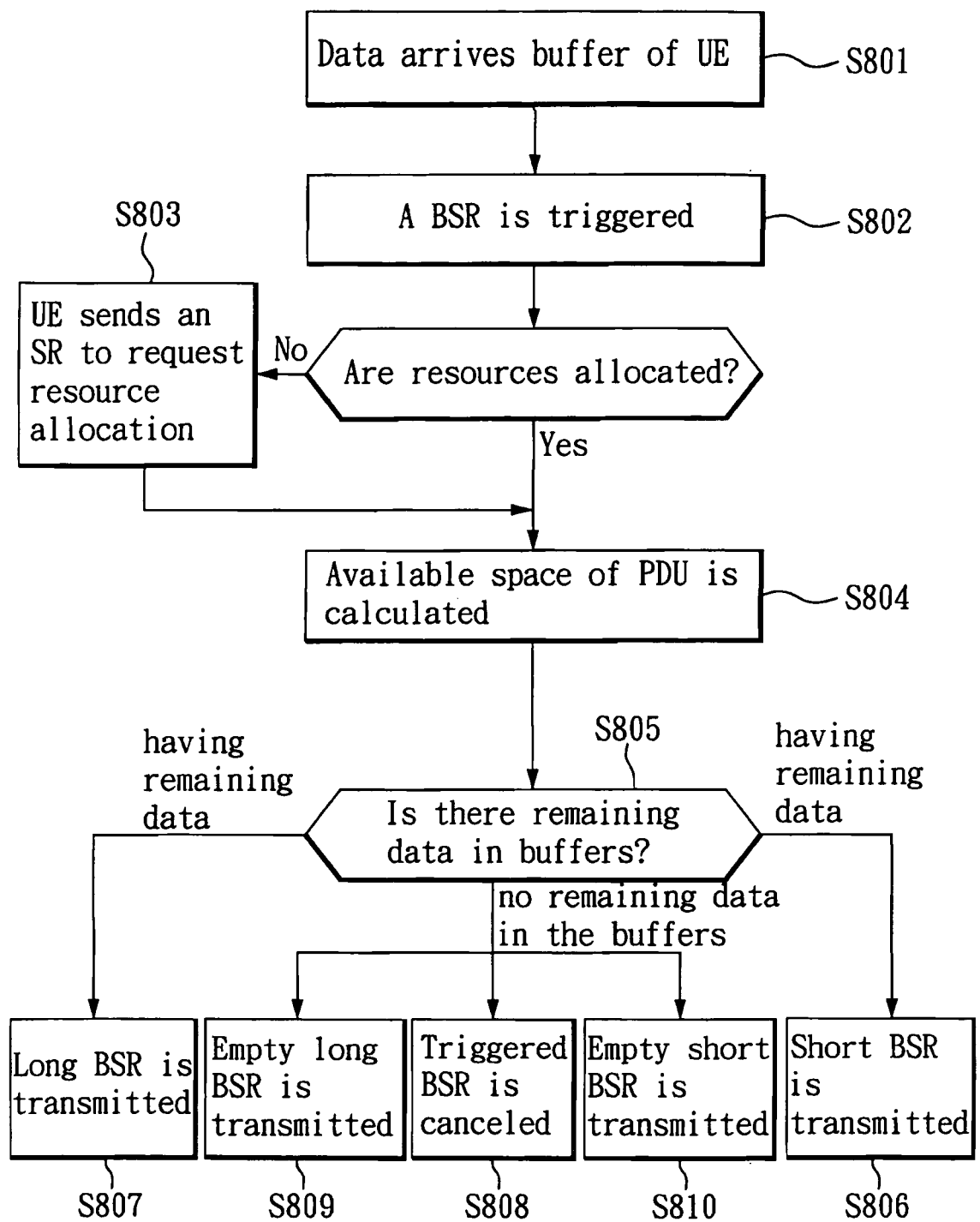
FIG. 8(A) is a flowchart of a method for providing a buffer status report in a mobile communication network according to another embodiment of the invention.

FIG. 8(A) is a flowchart of a method for providing a buffer status report in a mobile communication network according to another embodiment of the invention. First, data arrives to the buffer 611 of the user equipment 61, and the priority of the logical channel for the arrival data is higher than those of other logical channels for existing data in the buffers 611-614 (step S801). Accordingly, a buffer status report (BSR) associated with the buffers 611-614 of the LCGs 601-604 that contain data in the buffers 611-614 is triggered (step S802).

After the BSR is triggered, if the user equipment 61 does not have the resource allocation for the BSR transmission, it sends a scheduling request (SR) to the base station 62 to request a resource allocation (step S803).

The user equipment 61 calculates available space of a Protocol Data Unit (PDU) to be transmitted based on the resources allocated by the base station 62 (step S804) to thereby determine whether the available space of the PDU to be transmitted is enough for filling all data of the buffers 611-614 and a short BSR and determine a remaining space after the PDU to be transmitted is filled in the data of the buffers 611-614 and the short BSR. Step S805 is based on the calculation in step S804 to determine the remaining data in the buffers 611-614. If only the buffer 611, 612, 613 or 614 corresponding to the LCG 601, 602, 603 or 604 has the remaining data after the calculation in step S804, the user equipment 61 uses the PDU to be transmitted to transmit the data and the short BSR (step S806) associated with the buffer 611, 612, 613 or 614 of the LCG 601, 602, 603 or 604 that has the remaining data. If the remaining data is found in multiple buffers 611-614 of the LCG 601-604 after the calculation in step S804, the user equipment 61 uses the PDU to be transmitted to transmit the data and a long BSR (step S807). If there is no remaining data in the buffers 611-614, the BSR triggered in step S802 is canceled (step S808). In addition, when there is no remaining data in the buffers 611-614, if the remaining space of the PDU to be transmitted is enough to receive an empty long BSR, the user equipment 61 uses the PDU to be transmitted to transmit the data and the empty long BSR (step S809), and otherwise the data and an empty short BSR (step S810). As cited, when the BSR associated with the buffers 611-614 of the LCGs 601-604 that contain data in the buffers 611-614 is triggered, and only the buffer 611, 612, 613 or 614 of the LCG 601, 602, 603 or 604 has the remaining data after the data of the buffers 611-614 is filled in the PDU to be transmitted, only the short BSR associated with the buffer 611, 612, 613 or 614 of the LCG 601, 602, 603 or 604 that has the remaining data is transmitted, without transmitting a long BSR. Further, when there is no remaining data in the buffers 611-614, no BSR is transmitted. Thus, the use of network resources is reduced.

Figure 5:
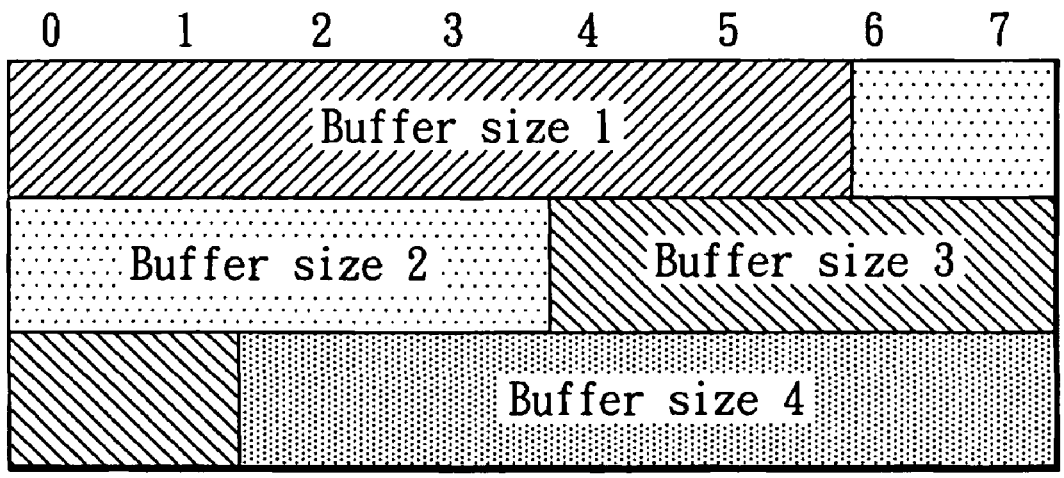
FIG. 5 is a typical format of a long BSR.
Figure 8B:
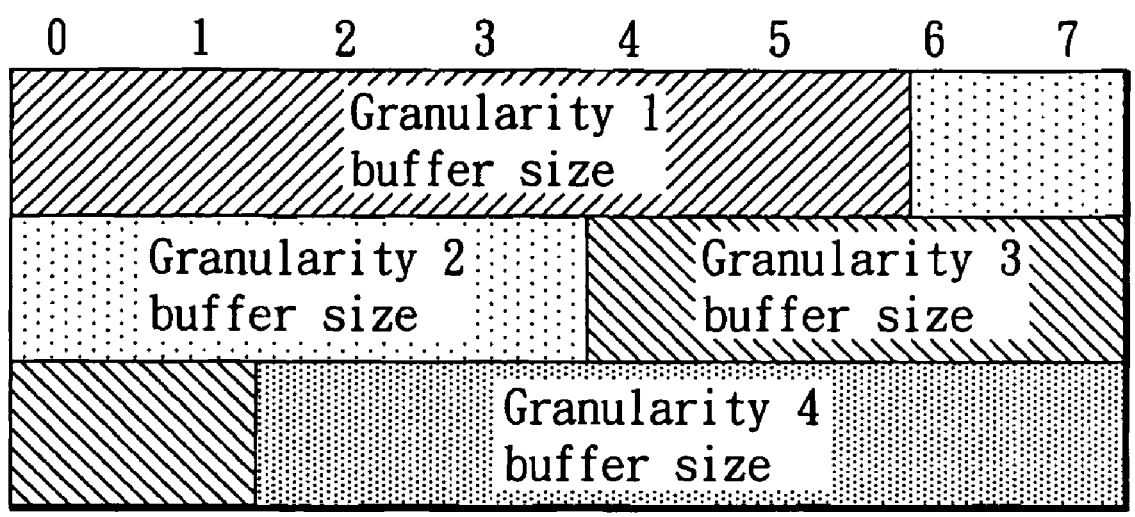
FIG. 8(B) is a format of a long buffer status report (BSR) according to another embodiment of the invention.

In this embodiment, the short BSR can have a format of FIG. 4 or FIG. 7(B), and the long BSR can have a format of FIG. 5 or FIG. 8(B) in which three bytes are included. The three bytes of the long BSR contain four 6-bit buffer size fields respectively corresponding to first to fourth LCG ID, i.e., LCG ID=1-4. Each buffer size field has a granularity, so all available data amount of all LCs of different LCGs can be indicated by means of different granularities. For example, a high granularity can be applied to identify all available data amount of all LCs of an LCG that requires the find data occupancy, and a low granularity can be applied to identify all available data amount of all LCs of an LCG that does not require the find data occupancy. In addition, the long BSRs transmitted by the UE can have different granularities.

Figure 9:
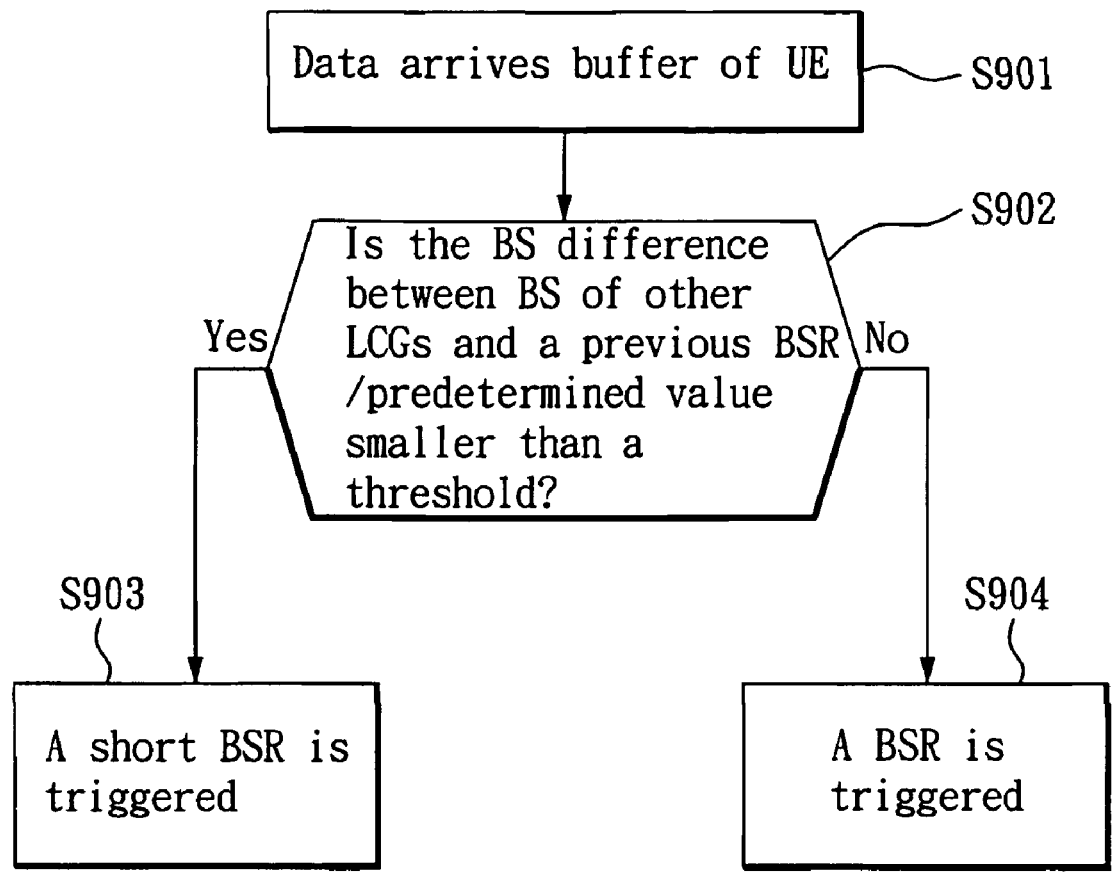
FIG. 9 is a flowchart of a method for providing a buffer status report in a mobile communication network according to a further embodiment of the invention.

FIG. 9 is a flowchart of a method for providing a buffer status report in a mobile communication network according to a further embodiment of the invention. First, a data arrives to the buffer 611 of the user equipment 61, and the priority of the logical channel for the arrival data is higher than those of other logical channels for existing data in the buffers 611-614 (step S901). The user equipment 61 further compares the buffer status 622-624 of other logical channel groups 602-604 without containing the arrival data and a previous buffer status report (BSR) (step S902) to thereby produce a comparison difference. Alternatively, the user equipment 61 may compare the buffer status 622-624 of other logical channel groups 602-604 without containing the arrival data and a predefined value (step S902) to produce the comparison difference. Then, the user equipment 61 triggers a short BSR (step S903) associated with the buffer 611 of the LCG 601 corresponding to the arrival data when the comparison difference is smaller than a threshold, thereby avoiding the undesired BSR from occupying the network resources. After the short BSR is triggered, the following steps are identical to the steps of FIG. 7(A) starting with the resource allocation, and thus no more detail is described. When the comparison difference is not smaller than the threshold, the user equipment 61 triggers a BSR (step S904). After the BSR is triggered, the following steps are identical to the steps of FIG. 8(A) starting with the resource allocation, and thus no more detail is described.

Although the present invention has been explained in relation to its preferred embodiment, it is to be understood that many other possible modifications and variations can be made without departing from the spirit and scope of the invention as hereinafter claimed.

What is claimed is:

1. A method for providing a buffer status report in a mobile communication network, which is implemented between a base station and one or more user equipments for providing the user equipments to report buffer status of the user equipments to the base station, wherein each user equipment has multiple logical channels divided into a plurality of logical channel groups (LCGs), each logical channel group corresponds to a buffer and a buffer status of the buffer, and each logical channel has a priority, the method comprising the steps of:

(A) having an arrival data to a buffer of the user equipment and the priority of a logical channel for the arrival data higher than those of other logical channels for existing data in the buffers;

(B) triggering a buffer status report (BSR) associated with the buffers of the LCGs that contain data in the buffers;

(C) using the user equipment to calculate available space of a Protocol Data Unit (PDU) to be transmitted based on resources allocated by the base station to thereby determine whether the available space of the PDU to be transmitted is enough for filling all data of the buffers of the LCGs and a short buffer status report, wherein the short buffer status report provides the buffer status corresponding to a single logical channel group (LCG), and the short buffer status report comprises a LCG identification (ID) field and a variable granularity buffer size field, the LCG ID field indicates the single LCG corresponding to the buffer status, and the variable granularity buffer size field indicates all available data amount of all LCs of the single LCG by means of different granularities;

(D) using the user equipment to transmit the short BSR corresponding to the buffer of an LCG when only the buffer of the LCG has remaining data; and (E) using the user equipment to transmit a long BSR when the buffers of multiple LCGs have remaining data.

2. The method as claimed in claim 1, further comprising the step of:

(F) canceling the BSR when there is no remaining data in the buffer.

3. The method as claimed in claim 1, further comprising the step of:

(G) using the user equipment to transmit an empty long BSR when there is no remaining data in the buffer.

4. The method as claimed in claim 1, further comprising the step of:

(H) using the user equipment to transmit an empty long BSR when no remaining data in the buffer and a remaining space enough to transmit the empty long BSR exist.

5. The method as claimed in claim 1, further comprising the step of:

(I) using the user equipment to transmit an empty short BSR when there is no remaining data in the buffer.

6. The method as claimed in claim 1, further comprising, in front of the step (A), the steps of:

(I) allocating the resources to the user equipment by the base station; and (J) using the user equipment to transmit a PDU to the base station for communication according to the resources.

7. The method as claimed in claim 1, further comprising, between the steps (B) and (C), the steps of:

(K) using the user equipment to send a scheduling request (SR) to the base station for requesting a resource allocation; and (L) allocating the resources to the user equipment by the base station.

8. The method as claimed in claim 1, wherein the LCG identification (ID) field is a 2-bit field and the variable granularity buffer size field is a 6-bit field.

9. The method as claimed in claim 1, wherein the long buffer status report provides the buffer status corresponding to all the logical channel groups.

10. The method as claimed in claim 9, wherein the long buffer status report comprises three bytes with four 6-bit buffer size fields respectively corresponding to first to fourth LCG ID, and each buffer size field has a granularity such that all available data amount of all logical channels of each LCG is indicated respectively by different granularities.

11. A method for providing a buffer status report in a mobile communication network, which is implemented between a base station and one or more user equipments for providing the user equipments to report buffer status of the user equipments to the base station, wherein each user equipment has multiple logical channels divided into a plurality of logical channel groups (LCG), each logical channel group corresponds to a buffer and a buffer status of the buffer, and each logical channel has a priority, the method comprising the steps of:

(A) having an arrival data to a buffer of the user equipment and the priority of a logical channel for the arrival data higher than those of other logical channels for existing data in the buffers;

(B) triggering a buffer status report (BSR) associated with the buffers of the LCGs that contain data in the buffers;

(C) using the user equipment to calculate available space of a Protocol Data Unit (PDU) to be transmitted based on resources allocated by the base station to thereby determine whether the available space of the PDU to be transmitted is enough for filling all data of the buffers of the LCGs and a short buffer status report;

(D) using the user equipment to transmit the short BSR corresponding to the buffer of an LCG when only the buffer of the LCG has remaining data; and (E) using the user equipment to transmit a long BSR when the buffers of multiple LCGs have remaining data, wherein the long BSR provides the buffer status corresponding to all the logical channel groups, and the long BSR comprises four buffer size fields respectively corresponding to first to fourth LCG ID, and each buffer size field has a granularity such that all available data amount of all logical channels of each LCG is indicated respectively by different granularities.

12. The method as claimed in claim 11, further comprising the step of:

(F) canceling the BSR when there is no remaining data in the buffer.

13. The method as claimed in claim 11, further comprising the step of:

(G) using the user equipment to transmit an empty long BSR when there is no remaining data in the buffer.

14. The method as claimed in claim 11, further comprising the step of:

(H) using the user equipment to transmit an empty long BSR when no remaining data in the buffer and a remaining space enough to transmit the empty long BSR exist.

15. The method as claimed in claim 11, further comprising the step of:

(I) using the user equipment to transmit an empty short BSR when there is no remaining data in the buffer.

16. The method as claimed in claim 11, further comprising, in front of the step (A), the steps of:

(I) allocating the resources to the user equipment by the base station; and (J) using the user equipment to transmit a PDU to the base station for communication according to the resources.

17. The method as claimed in claim 11, further comprising, between the steps (B) and (C), the steps of:

(K) using the user equipment to send a scheduling request (SR) to the base station for requesting a resource allocation; and (L) allocating the resources to the user equipment by the base station.

18. The method as claimed in claim 11, wherein each buffer size field is a 6-bit field.

* * * * *